(12) United States Patent
Ragsdale et al.

(10) Patent No.: US 7,247,658 B2
(45) Date of Patent: Jul. 24, 2007

(54) REDUCTION OF DISCOLORATION IN WHITE POLYURETHANE FOAMS

(75) Inventors: Mark E. Ragsdale, Duncan, SC (US); Philip T. Radford, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/615,283

(22) Filed: Jul. 8, 2003

(65) Prior Publication Data

US 2005/0009938 A1  Jan. 13, 2005

(51) Int. Cl.
*C08G 18/06* (2006.01)

(52) U.S. Cl. ............ 521/170; 252/182.24; 252/182.29; 252/397; 252/399; 252/401; 252/404; 252/405; 252/407; 521/99; 521/128; 521/130

(58) Field of Classification Search ............ 252/182.24, 252/182.29, 397, 399, 405, 407, 401, 404; 521/99, 128, 130, 170
See application file for complete search history.

(56) References Cited

U.S. PATENT DOCUMENTS

| 4,757,095 | A | * | 7/1988 | Galan et al. ................. 521/128 |
| 5,342,862 | A | * | 8/1994 | Reich .......................... 523/125 |
| 5,403,897 | A | | 4/1995 | Ebato et al. |
| 5,824,738 | A | * | 10/1998 | Humphrey et al. .......... 524/715 |
| 6,022,946 | A | * | 2/2000 | McCullough, Jr. ........... 528/480 |
| 6,294,590 | B1 | | 9/2001 | Ragsdale et al. |
| 6,348,514 | B1 | * | 2/2002 | Calabrese et al. ........... 521/130 |
| 6,395,797 | B2 | | 5/2002 | Ragsdale et al. |
| 6,441,071 | B1 | | 8/2002 | Van Nuffel |
| 6,500,911 | B1 | | 12/2002 | Endo et al. |
| 6,541,531 | B2 | | 4/2003 | Ragsdale ..................... 521/123 |
| 6,569,927 | B1 | * | 5/2003 | Gelbin ......................... 524/111 |
| 6,627,109 | B2 | * | 9/2003 | Ragsdale et al. ...... 252/182.24 |
| 6,679,754 | B2 | * | 1/2004 | Li et al. ...................... 428/373 |
| 6,703,443 | B2 | * | 3/2004 | Xia et al. .................... 524/589 |

* cited by examiner

*Primary Examiner*—John M. Cooney, Jr.
(74) *Attorney, Agent, or Firm*—Terry T. Moyer; Robert M. Lanning

(57) ABSTRACT

Surprisingly effective additive formulations for the reduction of highly undesirable yellowing or other discoloration of white, uncolored, polyurethane foam articles are provided. White polyurethane foam exhibits a susceptibility to yellowing and discoloration to a great extent, particularly in relatively short periods of time, than other types of polymeric articles. The inventive additives impart excellent low-discoloration properties over appreciable amounts of time of regular exposure to harmful elements, thereby according the pertinent industry a manner of providing white polyurethane foams for longer periods of time. Methods of producing such reliably white-colored polyurethane foams are also provided.

20 Claims, No Drawings

REDUCTION OF DISCOLORATION IN WHITE POLYURETHANE FOAMS

FIELD OF THE INVENTION

This invention relates to surprisingly effective additive formulations for the reduction of highly undesirable yellowing or other discoloration of white, or lightly colored, polyurethane foam articles. White polyurethane foam exhibits a susceptibility to yellowing and discoloration to a great extent, particularly in relatively short periods of time, than other types of polymeric articles. The inventive additives impart excellent low-discoloration properties over appreciable amounts of time of regular exposure to harmful elements, thereby according the pertinent industry a manner of providing white polyurethane foams for longer periods of time. Methods of producing such reliably white-colored polyurethane foams are also provided.

BACKGROUND OF THE INVENTION AND PRIOR ART

All U.S. patents noted below are fully incorporated herein by reference.

Polyurethane foam articles that include no coloring agents therein are, at the production stage, white in appearance. Such an uncolored article, particularly in slabstock form, is highly desirable for many different potential end-uses, ranging from mattresses, to novelty items and toys, to apparel accessories (i.e., women's shoulder pads), to undergarments, and the like. However, it has long been a problem that such white polyurethane foam articles (such as slabstock, rigid, or other types) exhibit a very high propensity for deleterious discolorations and yellowing due to a number of factors. Ultraviolet exposure, or lightfastness problems, reaction with oxidative atmospheric chemicals, thermal degradation or scorching during exothermic production all appear to contribute to such discoloration problems. As such, the ability to provide long-term white colorations has been a struggle for the polyurethane foam industry.

As noted above, such yellowing and/or discoloration problems appear to be the result of a combination of factors. Light stability, including ultraviolet exposure, appears to have a significant effect on products based on isocyanates, particularly upon aromatic isocyanates (one of the primary reactants to form the vast majority of polyurethane foams). Yellowing is a natural result thereof upon sufficient exposure to light and there is little protection from such a deleterious result without a protective additive or selection of more resilient polymer for polyurethane production.

Also contributing to such discoloration issues is gas fade, otherwise known as the exposure of such polyurethane foams to combustion byproducts that exist and are pervasive within many environments. The highly oxidative species generally present within such atmospheric materials (such as, for example, nitrous oxide) appear to readily react with reactive foam constituents such that modification of color therein readily occurs as a result. Furthermore, thermal conditions during the highly exothermic reaction of low density urethane foam formulations contribute as well to potential discoloration, particularly within the center of the target article (since this is the location of the greater exothermic activity during production). Brittleness of the foam, as well as yellowing and even browning are distinct and strong possibilities as a result. All together, the ability to produce white polyurethane is just as difficult as retaining white colorations within produced articles due to these highly problematic and readily pervasive conditions.

Since removal of such conditions is, for all intents and purposes, impossible, additives have been developed to remedy such problems individually. Benzotriazole-based additives have been found to alleviate a certain and significant level of discolorations resulting from ultraviolet light exposure, for example. White coloring agents (such as titanium dioxide, for example) can also be incorporated to mask potential yellowing, but such a solution has marginal benefit and can adversely affect the physical properties of the foam. As a result it is considered unsatisfactory the majority of the time. At least for this individual ultraviolet and/or light exposure issue, the aforementioned benzotriazoles appear to provide a certain degree of reliable protection.

Thermal exposure also appears to contribute problematic discoloration properties to such articles. Basically, it is well known that such polyurethane foam products require the presence of at least one catalyst to effectuate the desired reaction between the necessary polyol and isocyanate components. The most prevalent catalysts, due to cost in producing, using, and disposing, are tertiary amine-based compounds. These catalysts include hydroxyl terminated types, such as the most popular types used throughout the industry, DMEA (dimethyl ethanol amine), DABCO TL catalysts (blends of triethylene diamine and 2-[[2-(dimethylamino) ethyl]methylamino]ethanol), and Texacat ZF10 (N,N,N'-trimethyl-N'-hydroxyethyl-bis(aminoethyl)ether). These catalysts unfortunately present the ability to exaggerate certain problems within the resultant foams, most notably scorch discoloration and/or degradation. Scorching is a common occurrence within exothermic foam-producing reactions, particularly when air flow is minimized within the foam-making procedure.

Apparently, such catalysts react readily with free isocyanate due to their reactive hydroxyls within the polyurethane and/or colorants and/or other additives present. In particular, such heat generation is pronounced due to the avoidance of CFC-type blowing agents (which dissipate heat during high temperature exothermic reactions upon use). As it is, the foam blowing agents now utilized throughout the industry are ineffective at dissipating the very high temperatures generated during the curing process. These high temperatures appear to oxidize the polyol due to the reaction with free radicals and hydroperoxides generated during the curing process. Such compounds react readily with hard polyurethane segments within the foam product to form quinonoid-type structures that consequently cause color bodies to form. These resultant color bodies thus create discolorations within the final foam product since they are of a different color than the desired foam product. Apparently, such high temperature discolorations and degradations more readily occur between about 30 and 60 minutes after foam generation (during gelation and blowing of the foam-producing composition) has taken place. During such exothermic oxidation reactions, the foam is then "burned" by the high temperatures thereby producing the highly undesirable discolored areas within the resultant foam article. Such scorching may also cause degradation of "burned" portions of foam to the extent that the affected areas exhibit much different physical properties than the unaffected foam. In such an instance, generally the scorched portions will become more brittle (and more prone to tearing or a loss in resiliency) than the properly formed foam.

Attempts at alleviating these particular problems have included the addition of potentially environmentally unfriendly, and potentially toxic antioxidants, such as 2,6- di-t-butyl-4-methylphenol (BHT), octadecyl-3-(3,5-di-t-butyl-4-hydroxyphenyl)propanoate (Irganox® 1076, from Ciba Geigy), and octyl-3(3,5-di-t-butyl-4-hydroxyphenyl) propanoate (Irganox® 1135), within the curing process. This has proven only marginally effective; however, again due to the expense and the large amount of such antioxidant compounds required, as well as the large amount remaining within the foam (which may be troublesome due to environmental and safety concerns), such a procedure is necessarily avoided if at all possible. Since there is a 15 to 30 minute window of opportunity to control high temperature exposures, some foam producers have practiced forced air cooling of the foam-producing composition in the past to reduce scorch problems. Unfortunately, however, the cost involved with providing the necessary degree of heavy air flow (particularly in a specific limited direction) is prohibitive. With both procedures, the costs involved have resulted in transferred costs to the foam purchaser and end user. Alternative methods, either simpler and less expensive in nature, have not been forthcoming within the industry.

Thermal discoloration problems are not easily cured with the aforementioned benzotriazole compounds as foam additives, if at all, either. In greater detail, and as suggestions for remedying scorch problems in such polyurethane foams, U.S. Pat. No. 6,541,531 teaches certain organic cyclic esters as additives for such purpose. Also, the aforementioned BHT and similar derivatives thereof provide a certain degree of thermal protection to such foam articles.

However, such antioxidant compounds (as noted above, including BHT, etc.) for anti-scorch and benzotriazoles for UV/light protection cannot simultaneously protect the target polyurethane foams from highly oxidative combustion byproducts present within many atmospheric environments, particularly in urban and less populated centers. Such a phenomenon as gas fade has been largely ignored within the polyurethane industry due to the difficulties of protecting such foam articles from the oxidative species so pervasive around the world. As it is, it appears that the additives utilized for such protective reasons actually react readily with such combustion byproducts that discoloration, although alleviated during light exposure or scorching possibilities, is persistent, if not worse, due to gas fade exposure. The above-noted BHT is particularly susceptible to nitrous oxide reaction such that a pH dependent color body is generated that severely discolors the article. Such a colored product generates a highly undesirable unnatural aged appearance within the resultant article. Though BHT provides benefit in light and thermal testing, it thus exhibits severe limitations and deleterious effects in response to gas fade.

As such, it is apparent that this combination of factors has not been properly considered together, nor alleviated, at least through simple additive methods and formulations. Thus, there currently exists no effective remedy to such a three-pronged problem for producing and retaining naturally colored polyurethane foams with white appearances. The industry demands such a currently nonexistent improvement.

OBJECTS AND SUMMARY OF THE INVENTION

It is therefore an object of this invention to provide a relatively inexpensive and simple method of preventing, over an appreciable amount of time, the production of color bodies, or otherwise permitting relatively rapid discoloration and/or yellowing within uncolored polyurethane foam articles. A further object is to provide an easy-to-add additive formulation for introduction within polyurethane foam production procedures which effectively reduces and/or eliminates such potential discoloration and/or yellowing for an appreciable amount of time. A further objective of this invention is to provide a white polyurethane foam article that exhibits substantially no discolorations and/or yellowing for an acceptable period of time after exposure to light, ultraviolet light, and environmental materials.

Such objects have been rendered available through an extensive review of certain potential additive formulations for introduction within target polyurethane foam manufacturing procedures, and thus within target white polyurethane foams themselves. Different combinations of such varied compounds and compositions as antioxidants, hindered amine light stabilizers, and thermal reduction materials, led to a determination that the best overall discoloration reduction effects potentially available to the white (non-colored) polyurethane foam industry require the presence of at least three, and preferably four, different classes of additives. These are:

Class A: Benzotriazoles, and preferably those compounds that conform to the structure of Formula (I)

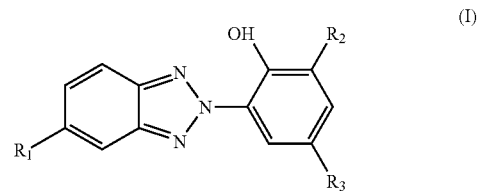

wherein $R_1$, $R_2$, and $R_3$ are individually selected from hydrogen, $C_xH_yO_z$, wherein x, y, and z are from 0 to 30, and halogen.

Class B: Lactone-based antioxidants, and preferably those compounds that conform to the structure of Formula (II)

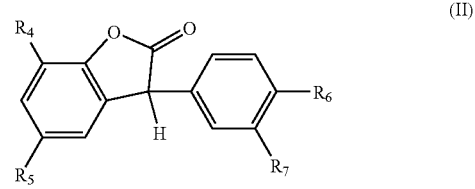

wherein $R_4$, $R_5$, $R_6$, and $R_7$ are individually hydrogen, $C_{1-30}$ alkyl, etc.

Class D: Hindered phenols or BHT derivatives, and preferably those compounds that conform to the structure of Formula (III)

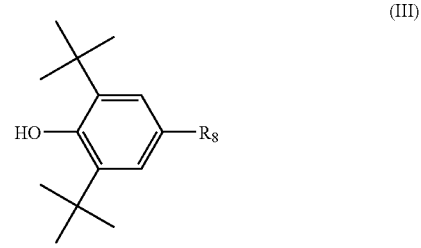

wherein $R_8$ is selected from the group consisting of hydrogen, $C_xH_yO_z$, where x, y, and z are from 0 to 30 and halogens.

Class C: Secondary phenylamines, and preferably those compounds that conform to the structure of Formula (IV)

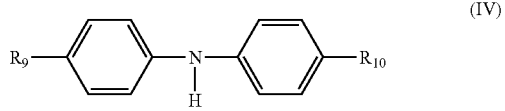

(IV)

wherein $R_9$ and $R_{10}$ are individually selected from the group consisting of hydrogen, $C_xH_yO_z$ where x, y, and z are from 0 to 30, and halogen.

Basically, it was surprisingly found that a synergy exists between these classes of compounds such that each of the above-noted problem areas, ultraviolet exposure, scorch, and most unexpectedly, gas fade, are alleviated through the presence of at least Class A and Class B, and either of Classes C or D, or both, to a degree that longevity of retention of white (non-colored) appearances in target polyurethane foams are greater than for any other previously disclosed method.

Most of these required classes of compounds are specifically known as antioxidants and thus, it is believed, without intending to be tied to any specific scientific theory, act in such a manner to selectively react with potentially harmful oxidative species before an appreciable amount thereof can react with the polyurethane constituents. An antioxidant is a material added to an article to improve the resistance of the foam to oxidative-type reactions. The role of the antioxidant is composed of three steps, namely, initiation, propagation, and termination and is explained in the figure below.

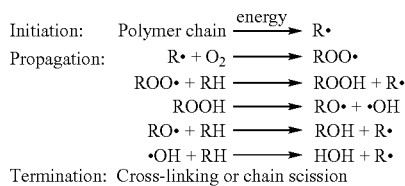

Thus, as above, it is believed that the selectivity of each specific class of antioxidant present within the target foam sufficiently reacts with ultraviolet-exposed color bodies before they propagate, and/or with nitrous oxide (or other highly reactive oxidants) that pervade common environments, and also provide some thermal protection.

Accordingly, this invention is directed to a polyurethane foam additive formulation comprising at least three components, wherein two of such components consist of at least one benzotriazole and at least one lactone-based antioxidant, and the third is selected from the group consisting of at least one secondary phenyl amine, at least one hindered phenol or BHT derivative, and any mixtures thereof. Preferably, as noted above, a mixture of these last two types of compounds is present. A method of producing a polyurethane foam article is also encompassed within this invention comprising the steps of: a) providing a polyol composition optionally comprising at least one of the required components from the above-listed polyurethane foam additive formulation; b) providing an isocyanate composition optionally comprising at least one of the required components from the above-listed polyurethane foam additive formulation; wherein all of said polyurethane foam additive formulation is present within the combined compositions of "a" and "b"; c) reacting the compositions from steps "a" and "b" together in the presence of a suitable catalyst. The resultant articles are also contemplated within this invention, including those comprising the foam additive formulation, as above, or exhibiting a non-colored white appearance after exposure to a Xenon lamp and gas testing over an appreciable length of time.

In general, polyurethane foam is produced through the catalyzed polymerization of the reaction products of polyols and isocyanates. Such a reaction is well known throughout the polyurethane industry and has been practiced for many years. The potential number and types of polyols utilized within this invention are plentiful. Such a compound is defined as comprising at least two alcohol moieties, preferably at least three. The free hydroxyl groups react well with the isocyanates to form the urethane components which are then polymerized to form the desired polyurethanes. Blowing agents present within the polymerization step provide the necessary foam-making capability. Preferred polyols thus comprise between three and six alcohol moieties, comprising from between one and six carbon atoms per alcohol moiety. Most preferred is a typical trifunctional polyol, F3022 polyol, available from Bayer.

Isocyanates, most preferred diisocyanates, are well known components of such polyurethane foams and include any compounds which possess at least one free cyanate reactive group, and most preferably two, although more may be utilized. Such compounds are may also be aliphatic or aromatic in nature. The most prominently utilized isocyanates, and thus the most preferred types for this invention, are toluene diisocyanate and methylene diisocyanate. The polyol is generally reacted with a slight excess of isocyanate (ratio of from 1:1.04 to 1:1.12) to produce a soft foam product; the greater the ratio, the harder the produced foam). In practice, two separate streams of liquids (one of polyol, the other of isocyanate) are mixed together in the presence of a polymerization catalyst and a blowing agent in order to produce the desired polyurethane foam product.

The term suitable catalyst encompasses any type that effectuates the polymerization of the isocyanate/polyol reactants noted above to form the desired polyurethane in foam form. The term "tertiary amine-based hydroxy-containing catalyst" is intended to encompass any gelation/blowing catalyst utilized within polyurethane production which comprises at least one amine constituent. As noted above, amine-based catalysts, and more specifically, tertiary amine catalysts, are widely utilized within such specific foam-producing methods. Two catalysts, in particular, DABCO TL, and DMEA, are excellent gelation/blowing catalysts for this purpose; however, they also appear to be extremely reactive with and readily attack unmatched electrons on nitrogen-containing moieties. As noted above, oxidation by the amine readily occurs upon exposure to high temperatures, thus resulting in the undesirable scorched foam portions. Although any amine presents such a potential reactivity (oxidation) problem, and thus is contemplated within the scope of this invention, it has been found that the highly reactive tertiary amines present greater threats to discoloration and degradation to the final foam product. The amount of tertiary amine hydroxy-containing catalyst required to effectuate the desired urethane polymerization is extremely low, from between 0.05 php to about 1.00 php (php indicating parts per hundred of the polyol content within the foam-making composition); more specifically, such a range is from about 0.07 php to about 0.60 php. Even though the number of free amines available are quite low, their ability to deleteriously affect the final foam product through oxidation of free reactive groups (hydroxyls, for example) within colorants, polyols, and other additives, is pronounced upon exposure to high temperature during polymerization.

The additives present within the inventive non-colored polyurethane foam articles and compositions discussed above should be added to the polyol component in the following ranges of amounts (with the unit php indicating parts per hundred polyol component): all Class A additives are present from 0.5 to 6.0 php, preferably from 0.8 to 2.0 php, and most preferably from 1.2 to 1.7 php; all Class B additives are present from 0.05 to 1.0 php, preferably from 0.1 to 0.7 php, and most preferably from 0.15 to 0.3 php; all Class C additives, if present within the target foam composition, are present from 0.05 to 1.0 php, preferably from 0.1 to 0.5 php, and most preferably from 0.25 to 0.4 php; and all Class D additives, if present within the target foam composition, are present from 0.05 to 2.0 php, preferably from 0.1 to 1.5 php, and most preferably from 0.25 to 0.65 php. Examples of potentially preferred, non-limiting compounds that meet the definitions of the different additives within Classes A-D include the following: Class A-TINUVIN® 326, from Ciba Additives;

Class B-HP136, from Ciba Additives; Class C-IRGANOX® 5057, from Ciba Additives; and Class D-IRGANOX® 1135, from Ciba Additives.

Other additives or solvents may also be present within the foam-making composition. Auxiliary blowing agents are required to provide the necessary foam blowing capability and reduce chances of combustion. Such compounds include methylene chloride, acetone, carbon dioxide (which may be liberated during the reaction between water and isocyanate), and the like, and are present in amounts of between about 1.0 php and 10 php of the entire foam-making composition. Water may thus also be added in relatively low amount (i.e., from about 3 to about 10 php; most preferably between about 3 and 7 php) to provide carbon dioxide for blowing purposes. Silicones may be added to provide desired cell structure and foam stability and are present in an amount from about 0.1 to about 2 php of the entire foam-making composition; preferably from about 0.9 to about 1.6 php.

One particularly effective additive has been found to be a polymeric colorant that absorbs in the blue to bluish violet portion of the visible spectrum. Such a colorant, such as, for example REACTINT® Violet X80 LT from Milliken & Company, appears to provide excellent protection from yellowing in very low additive amounts (from 0.001 php to 0.01 php, for instance, with about 0.003 php preferred for such a purpose).

DESCRIPTION OF THE PREFERRED EMBODIMENT

A standard polyurethane foam article was first produced to investigate the results of light, gas, and thermal exposures in terms of any discolorations, yellowings, and/or other types of degradations. Such a foam was produced through the reaction of the following components:

TABLE

| Component | Amount |
| --- | --- |
| F3022 Polyol | 100 parts |
| Water | 4.53 php |
| DABCO TL (catalyst) | 0.15 php |
| DABCO T10 (catalyst) | 0.30 php |
| L520 Silicone (from Witco) | 1.0 php |
| 80/20 toluene diisocyanate | 43.6 php |
| Additive from Category A (Tinuvin 326) | as noted |
| Additive from Category B (HP136) | as noted |
| Additive from Category C (Irganox 5057) | as noted |
| Additive from Category D (Irganox 1135) | as noted |

Upon mixture within a reaction vessel, the reaction created a "health" bubble (indicating gelation and blowing balance), and the vessel was then exposed to 185° C. (generated within a microwave oven to simulate actual heat history encountered on an industrial production level) for about 10 minutes. The resultant foam bun was then sliced in half and analyzed empirically for discolorations and/or physical property loss. Otherwise, the bun was reformed and tested under Xenon lamp testing (AATCC Test No. 16-1999) and Gas Fade Testing (AATCC No. 23-1999). The results, in comparison with a Control (with no additives present), are listed in tabular form below. A light test result of above 20 was unacceptable after 13 hours exposure. A gas fade test result in excess of 20 was also considered unacceptable. The results of the light and gas fade are listed for each experiment in DEcmc, the change in color from the initially produced sample prior to any aging, gas fade exposure, and/or Xenon light exposure. The additive combinations utilized for testing are first presented followed by the test results.

COMPOSITION TABLE 1

| Inventive and Comparative Additive Combinations Added to Target Polyurethane Foams | | | | |
| --- | --- | --- | --- | --- |
| | Additive A (php) | Additive B (php) | Additive C (php) | Additive D (php) |
| Comb. # | | | | |
| 1 | 1.50 | 0.17 | 0.30 | 0.57 |
| 2 | 1.50 | 0.17 | 0 | 0.57 |
| 3 | 1.50 | 0 | 0.30 | 0.57 |
| 4 (Comparatives) | 0.65 | 0.07 | 0 | 0.28 |
| 5 | 0 | 0.33 | 0.50 | 0.17 |
| 6 | 0.61 | 0 | 0.12 | 0.27 |
| 7 | 0 | 0.85 | 1.27 | 0.42 |

EXPERIMENTAL TABLE 1

| Lightfastness and Gas Fade Test Results | | |
| --- | --- | --- |
| | Lightfastness (13 hr) | Gas Fade (2 hr) |
| Combination # | | |
| 1 | 10.99 | 8.68 |
| 2 | 11.82 | 16.81 |
| 3 | 8.34 | 12.74 |
| 4 (Comparatives) | 18.02 | 27.79* |
| 5 | 40.96 | 16.17 |
| 6 | 19.68 | 30.82* |
| 7 | 43.21 | 15.17 |

Clearly, Inventive Combinations 1-4 exhibited the best overall results. None of the resultant polyurethane foam buns exhibited any scorch or discoloration inside either.

The compositions listed in the Composition Table, above, were then utilized in further test polyurethane applications.

COMPARATIVE TESTING

In addition, to the testing shown above an extensive analysis of comparative samples was conducted. The results in terms of Lightfastness, Gas Fade, Thermal Discoloration (Antiscorch), and Hot Compression Mold Measurements are provided in tabular form below. Thermal Discoloration testing involved curing a foam formulation through exposure to a certain level and duration of microwave radiation (20% power for 10 minutes to reproduce foam exotherms). The Hot Compression Mold Measurements involved squeezing a single 3 inch by 3 inch foam sample between 2 metal plates held at a specific temperature (from 375-400° F.) for 1-2 minutes under constant pressure (100 psi) and subsequently measuring the discoloration of the foam sample, if any. The inventive compositions utilized for these comparative studies are listed first below:

COMPOSITION TABLE 2

Inventive Additive Combinations Added to Target Polyurethane Foams

| Comb. # | Additive A (php) | Additive B (php) | Additive C (php) | Additive D (php) |
|---------|------------------|------------------|------------------|------------------|
| AA | 1.50 | 0.57 | 0.33 | 0.50 |
| BB | 1.50 | 0.17 | 0.33 | 0.50 |
| CC | 1.50 | 0.17 | 0.33 | 0.50 |

Each of these combinations included 0.003 php of REACTINT® Violet X80LT. Combination BB included 1.0 php of a commercially available additive for protecting uncolored foams, available from Union Chemical under the tradename 640L. The comparative additives were all commercially available types, as follows: Comparative DD, a Ciba Additives product, known as B-75, including a mixture of 20% by weight of IRGANOX® 1135, 40% by weight of TINUVIN® 765, and 40% by weight of TINUVIN® 571; Comparative EE, being a Crompton Corporation additive available under the tradename of CS-31; Comparative FF, being the same 640L additive utilized in BB, above, but alone without any further stabilizing additives present; and Comparative GG, being an Ortegol additive available under the tradename of LS-1. A control, additive-free foam sample was also produced for comparison purposes. The test results were as follows for all of these Inventive and Comparative Sample foams (produced in the same manner as noted above):

EXPERIMENTAL TABLE 2

Xenon Lightfastness Testing

|  | Additive Added Amount | DE cmc |
|---|---|---|
| Example |  |  |
| AA | 1.0 php | 16.27 |
| AA | 2.0 php | 12.57 |
| BB | 1.0 php | 16.13 |
| BB | 2.0 php | 12.42 |
| CC | 1.0 php | 15.44 |
| CC | 2.0 php | 10.86 |
| (Comparatives) |  |  |
| DD | 1.0 php | 16.92 |
| DD | 2.0 php | 15.11 |
| EE | 1.0 php | 19.43 |

EXPERIMENTAL TABLE 2-continued

Xenon Lightfastness Testing

|  | Additive Added Amount | DE cmc |
|---|---|---|
| EE | 2.0 php | 15.09 |
| FF | 1.0 php | 19.81 |
| FF | 2.0 php | 15.77 |
| GG | 1.0 php | 18.43 |
| GG | 2.0 php | 13.94 |
| Control | 0 | 2.41 |

EXPERIMENTAL TABLE 3

Gas Fade Testing

|  | Additive Added Amount | DE cmc |
|---|---|---|
| Example |  |  |
| AA | 1.0 php | 15.77 |
| AA | 2.0 php | 16.37 |
| BB | 1.0 php | 16.44 |
| BB | 2.0 php | 14.39 |
| CC | 1.0 php | 18.29 |
| CC | 2.0 php | 15.89 |
| (Comparatives) |  |  |
| DD | 1.0 php | 36.39 |
| DD | 2.0 php | 34.33 |
| EE | 1.0 php | 23.96 |
| EE | 2.0 php | 18.46 |
| FF | 1.0 php | 23.55 |
| FF | 2.0 php | 27.85 |
| GG | 1.0 php | 22.74 |
| GG | 2.0 php | 27.82 |
| Control | 0 | 2.46 |

EXPERIMENTAL TABLE 4

Microwave Scorch Testing

|  | Additive Added Amount | DE cmc |
|---|---|---|
| Example |  |  |
| AA | 2.0 php | 38.3 |
| (Comparatives) |  |  |
| DD | 2.0 php | 78.63 |
| EE | 2.0 php | 74.26 |
| FF | 2.0 php | 60.08 |
| GG | 2.0 php | 63.89 |
| Control | 0 | 45.93 |

EXPERIMENTAL TABLE 5

Hot Compression Molding Testing

|  | Additive Added Amount | DE cmc |
|---|---|---|
| Example |  |  |
| AA | 3.0 php | 5.37 |
| BB | 3.0 php | 1.92 |
| CC | 3.0 php | 2.12 |
| (Comparatives) |  |  |
| DD | 3.0 php | 5.48 |
| EE | 3.0 php | 4.26 |
| FF | 3.0 php | 3.39 |
| GG | 3.0 php | 4.6 |
| Control | 0 | 27.35 |

Thus, it is evident that in terms of providing effective results for all of these different criteria, the inventive additive formulations provide the best overall performance than the prior available polyurethane foam additive packages.

While the invention will be described and disclosed in connection with certain preferred embodiments and practices, it is in no way intended to limit the invention to those specific embodiments, rather it is intended to cover equivalent structures structural equivalents and all alternative embodiments and modifications as may be defined by the scope of the appended claims and equivalence thereto.

We claim:

1. A composition suitable for use in the manufacture of a polyurethane foam, the composition comprising:
   (a) a polyol,
   (b) a benzotriazole, the benzotriazole being present in the composition in an amount of about 0.5 to about 6.0 parts per hundred parts of the polyol (php),
   (c) a lactone-based antioxidant having a 3-phenylbenzofuran-2-one structure, the lactone-based antioxidant being present in the composition in an amount of about 0.05 to about 1.0 php,
   (d) a fourth component selected from the group consisting of:
      (i) about 0.05 to about 1.0 php of a secondary phenylamine,
      (ii) about 0.05 to about 2.0 php of a hindered phenol, and
      (iii) a combination of about 0.05 to about 1.0 php of a secondary phenylamine and about 0.05 to about 2.0 php of a hindered phenol, and
   (e) an isocyanate.

2. The composition of claim 1 wherein said fourth component is a secondary phenylamine.

3. The composition of claim 1 wherein said fourth component is a hindered phenol.

4. The composition of claim 1, wherein said fourth component is a combination of a secondary phenylamine and a hindered phenol.

5. The composition of claim 1, wherein said composition comprises:
   (a) a polyol,
   (b) about 0.8 to about 2.0 php of a benzotriazole,
   (c) about 0.1 to about 0.7 php of a lactone-based antioxidant having a 3-phenylbenzofuran-2-one structure,
   (d) a fourth component comprising:
      (i) about 0.1 to about 0.5 php of a secondary phenylamine, and
      (ii.) about 0.1 to about 1.5 php of a hindered phenol, and
   (e) an isocyanate.

6. The composition of claim 5, wherein said composition comprises:
   (a) a polyol,
   (b) about 0.8 to about 2.0 php of a benzotriazole,
   (c) about 0.15 to about 0.3 php of a lactone-based antioxidant having a 3-phenylbenzofuran-2-one structure,
   (d) a fourth component comprising:
      (i) about 0.1 to about 0.5 php of a secondary phenylamine, and
      (ii) about 0.25 to about 0.65 php of a hindered phenol, and
   (e) an isocyanate.

7. The composition of claim 1 wherein said benzotriazole conforms to the structure of Formula (I)

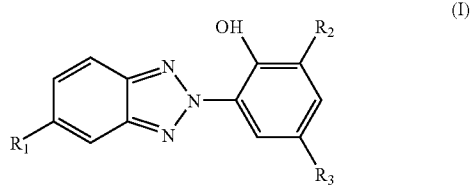

wherein $R_1$, $R_2$, and $R_3$ are individually selected from the group consisting of hydrogen, groups conforming to the formula $C_xH_yO_z$, where x, y, and z are from 0 to 30, and halogens.

8. The composition of claim 5 wherein said benzotriazole conforms to the structure of Formula (I)

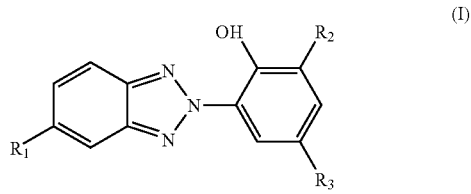

wherein $R_1$, $R_2$, and $R_3$ are individually selected from the group consisting of hydrogen, groups conforming to the formula $C_xH_yO_z$, where x, y, and z are from 0 to 30, and halogens.

9. The composition of claim 6 wherein said benzotriazole conforms to the structure of Formula (I)

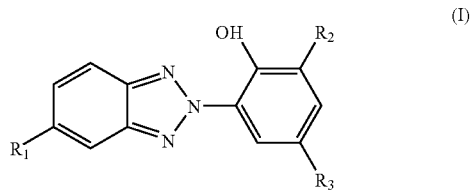

wherein $R_1$, $R_2$, and $R_3$ are individually selected from the group consisting of hydrogen, groups conforming to the formula $C_xH_yO_z$, where x, y, and z are from 0 to 30, and halogens.

10. The composition of claim 1 wherein said lactone-based antioxidant conforms to the structure of Formula (II)

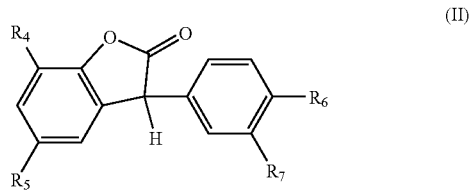

wherein $R_4$, $R_5$, $R_6$, and $R_7$ are individually selected from the group consisting of hydrogen and $C_{1-30}$ alkyl groups.

11. The composition of claim 5 wherein said lactone-based antioxidant conforms to the structure of Formula (II)

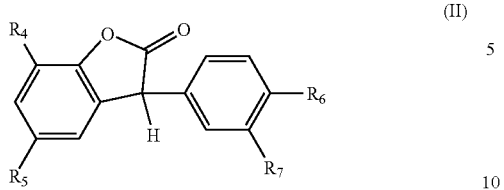

(II)

wherein $R_4$, $R_5$, $R_6$, and $R_7$ are individually selected from the group consisting of hydrogen and $C_{1-30}$ alkyl groups.

12. The composition of claim 6 wherein said lactone-based antioxidant conforms to the structure of Formula (II)

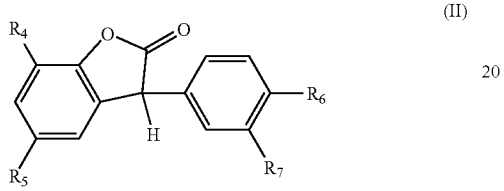

(II)

wherein $R_1$, $R_5$, $R_6$, and $R_7$ are individually selected from the group consisting of hydrogen and $C_{1-30}$ alkyl groups.

13. The composition of claim 1 wherein the secondary phenylamine conforms to the structure of Formula (IV)

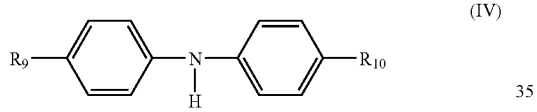

(IV)

wherein $R_9$ and $R_{10}$ are individually selected from the group consisting of hydrogen, groups conforming to the formula $C_xH_yO_z$, where x, y, and z are from 0 to 30, and halogens.

14. The composition of claim 5 wherein the secondary phenylamine conforms to the structure of Formula (IV)

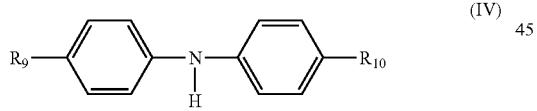

(IV)

wherein $R_9$ and $R_{10}$ are individually selected from the group consisting of hydrogen, groups conforming to the formula $C_xH_yO_z$, where x, y, and z are from 0 to 30, and halogens.

15. The composition of claim 6 wherein the secondary phenylamine conforms to the structure of Formula (IV)

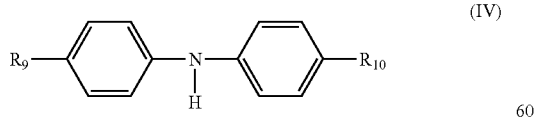

(IV)

wherein $R_9$ and $R_{10}$ are individually selected from the group consisting of hydrogen, groups conforming to the formula $C_xH_yO_z$, where x, y, and z are from 0 to 30, and halogens.

16. The composition of claim 1 wherein the hindered phenol conforms to the structure of Formula (III)

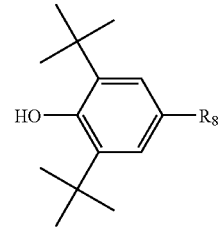

(III)

wherein $R_8$ is selected from the group consisting of hydrogen, groups conforming to the formula $C_xH_yO_z$, where x, y, and z are from 0 to 30, and halogens.

17. The composition of claim 5 wherein the hindered phenol conforms to the structure of Formula (III)

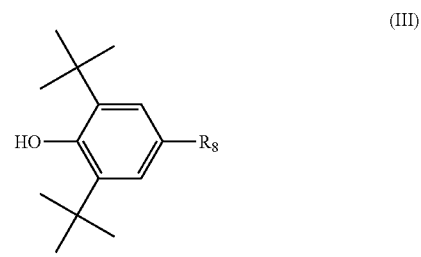

(III)

wherein $R_8$ is selected from the group consisting of hydrogen, groups conforming to the formula $C_xH_yO_z$, where x, y, and z are from 0 to 30, and halogens.

18. The composition of claim 6 wherein the hindered phenol conforms to the structure of Formula (III)

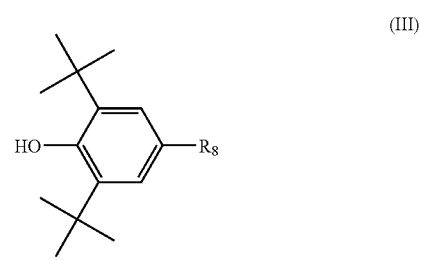

(III)

wherein $R_8$ is selected from the group consisting of hydrogen, groups conforming to the formula $C_xH_yO_z$, where x, y, and z are from 0 to 30, and halogens.

19. A composition comprising:
(a) a polyol,
(b) a benzotriazole,
(c) a lactone-based antioxidant having a 3-phenylbenzofuran-2-one structure,
(d) a fourth component selected from the group consisting of secondary phenylamines, hindered phenols, and combinations thereof, and
(e) an isocyanete.

20. The composition of claim 19, wherein the composition comprises:
(a) the polyol,
(b) the benzotriazole in an amount of about 0.5 to about 6.0 parts per hundred parts of the polyol (php),
(c) the lactone-based antioxidant in an amount of about 0.05 to about 1.0 php, (d) a fourth component selected from the group consisting of:
  (i) about 0.05 to about 1.0 php of a secondary phenylamine,
  (ii) about 0.05 to about 2.0 php of a hindered phenol, and
  (iii) a combination of about 0.05 to about 1.0 php of a secondary phenylamine and about 0.05 to about 2.0 php of a hindered phenol, and
(e) an isocyanate.

* * * * *

UNITED STATES PATENT AND TRADEMARK OFFICE
CERTIFICATE OF CORRECTION

PATENT NO. : 7,247,658 B2  Page 1 of 1
APPLICATION NO. : 10/615283
DATED : July 24, 2007
INVENTOR(S) : Mark E. Ragsdale and Philip T. Radford It is certified that error appears in the above-identified patent and that said Letters Patent is hereby corrected as shown below:

In Column 14, line 60 delete "isocyanete" and insert --isocyanate--

Signed and Sealed this

Twenty-ninth Day of April, 2008

JON W. DUDAS
*Director of the United States Patent and Trademark Office*